United States Patent Office 3,574,130
Patented Apr. 6, 1971

3,574,130
EUROPIUM ACTIVATED RARE EARTH PHOS-
PHORS CONTAINING TRIVALENT CERIUM
BRIGHTNESS CONTROL
James E. Mathers, Ulster, and Emil J. Mehalchick,
Towanda, Pa., assignors to Sylvania Electric Products
Inc.
No Drawing. Filed Jan. 16, 1969, Ser. No. 791,771
Int. Cl. C09k 1/10, 1/14, 1/44
U.S. Cl. 252—301.4                6 Claims

ABSTRACT OF THE DISCLOSURE

An improved process for the manufacture of europium-activated rare earth oxide phosphors, europium-activated rare earth phosphors derived from rare earth oxides and mixtures thereof and the improved phosphors are disclosed. The improvement comprises controlling the brightness of the phosphor by incorporating a controlled amount of cerium into the europium-activated rare earth oxide at the time of synthesis of the europium-activated rare earth oxide.

BACKGROUND OF THE INVENTION

This invention relates to the manufacture of luminescent compositions; more particularly it relates to europium-activated rare earth phosphors having a controlled brightness.

The new red-emitting europium-activated rare earth phosphors have the highest brightness of any red-emitting phosphors known. While this brightness is advantageous to many applications, when a multi-phosphor system is used, that is one in which there are other phosphors employed that emit different colors, it is often desirable to have all the phosphors in a system to have the same degree of brightness when subjected to the same intensity of excitation. Thus, it can be advantageous to control the brightness of the red-emitting phosphors and thereby enable the same level of brightness to be achieved by the red-emitting phosphors as with the other phosphors employed in a multi-phosphor system. It is highly desirable that the other properties of the phosphor, such as color, decay time and the like, remain relatively constant. It is believed, therefore, that a method that controls the brightness of the red-emitting europium-activated rare earth phosphors without changing the properties of the phosphor would be an advancement in the art.

SUMMARY OF THE INVENTION

In accordance with one aspect of this invention, it has been discovered that the brightness of europium-activated rare earth phosphor compositions selected from the group consisting of europium-activated rare earth oxide phosphors, europium-activated rare earth phosphors derived from europium-activated rare earth oxides and mixtures thereof, can be controlled by incorporating a controlled amount of cerium into the europium-activated rare earth oxide at the time of synthesis of the rare earth oxide. In each instance the process involves a synthesis of an europium-activated rare earth oxide in the presence of a controlled amount of cerium. It is believed surprising that cerium will afford a readily controllable system because the addition of other elements such as zirconium, titanium, hafnium, tantalum, niobium, terbium, dysprosium, praseodymium and the like, either shift the color or introduce objectionable decay characteristics.

In accordance with another aspect of this invention, the controlled brightness phosphor is an europium-activated rare earth phosphor selected from the group consisting of yttrium vanadate, yttrium oxysulfide, yttrium oxide, gadolinium oxide and mixtures thereof and containing from about $1.75 \times 10^{-5}$ moles $Ce^{+3}$ to about $0.8 \times 10^{-3}$ moles $Ce^{+3}$ per mole of rare earth in the phosphor.

For a better understanding of the present invention, together with other and further objects, advantages and capabiilties thereof, reference is made to the following disclosure and appended claims in connection with the above description of some aspects of the invention.

DESCRIPTION OF THE PREFERRED EMBODIMENTS

While the invention is described herein as applying to the rare earth phosphors, it is to be understood that yttrium is considered as a rare earth since it behaves similarly to some of the rare earths of the lanthanide series such as gadolinium and lanthanum within the phosphor art. Illustrative of typical europium-activated red-emitting rare earth phosphors, the brightness of which can be controlled by the present invention, include yttrium oxide, yttrium oxysulfide, yttrium orthovanadate, gadolinium oxide, mixed yttrium-gadolinium oxide and the like. Any europium-activated rare earth phosphor can be controlled by the process of the invention as long as the phosphor is either a rare earth oxide or is derived from a rare earth oxide. By derived from a rare earth oxide is meant that an europium-activated rare earth oxide is an intermediate in the formation of the phosphor.

Relatively minor amounts of cerium are required to affect the desired control. In most instances, from about $1.75 \times 10^{-5}$ moles of $Ce^{+3}$ to about $0.8 \times 10^{-3}$ moles of $Ce^{+3}$ per mole of rare earth oxide are sufficient to control the brightness to the degree desired. In most instances the brightness of the resulting phosphor will be at least 40% of the brightness of europium-activated yttrium vanadate without any detectable amount of cerium as measured by standard reflectance measurements, e.g. spectrophotometers. The actual amount required for a particular phosphor will be dependent upon several factors such as the molar ratio of the europium activator to the rare earth oxide, the level of impurities in the phosphor and the particle size of the final phosphor product. In general, however, for a phosphor having other factors constant, the reduction in brightness resulting from the addition of a known amount of cerium can be predicted with a relatively high degree of accuracy.

As is previously mentioned, it is necessary to incorporate the cerium into the europium-activated rare earth oxide matrix at the time of synthesis of the phosphor. In most instances the rare earths and europium activator are precipitated from an acidic aqueous solution as an insoluble salt, normally as oxalates. A preferred method of incorporating the desired amount of cerium is to add a soluble cerium source prior to the precipitation of the europium-activated rare earths as oxalates. The cerium precipitates along with the oxalates is then incorporated as oxalate and is subsequently converted to cerium oxide during the subsequent heating step. By soluble, it is meant that the cerium source will dissolve in the medium containing rare earths and europium. In most instances, cerium oxide will be the preferred cerium source, however, other soluble salts of cerium can be used, if desired. Typical cerium sources include cerium carbonate, cerium acetate, cerous nitrate, cerous sulfate and the like.

As previously mentioned, it is necessary to incorporate the cerium into the europium-activated rare earth oxide matrix at the time the europium-activated rare earth oxide is formed. Blending or mixing a cerium source into the europium-activated rare earth oxide phosphor after the formation of the phosphor does not achieve the benefits of this invention. It is also to be noted that although in some instances a rare earth oxide can be one of the starting materials that can be reformed as a europium-activated rare earth phosphor, these starting materials are not europium-activated. It is also to be noted that the process is beneficial for controlling the brightness of the europium-activated rare earth phosphors derived from europium-activated rare earth oxides such as yttrium orthovanadate and yttrium oxysulfide. In the instances where rare earth oxide derived phosphors are produced it is necessary to incorporate the controlled amount of cerium into the europium-activated rare earth oxide prior to its conversion to the other compound.

It has been found that the brightness of the luminescense of the phosphors is controlled regardless of the excitation medium. The excitation medium can be ultraviolet light or cathode rays, for example, and the brightness of the phosphor is controlled by the practice of this invention.

Example I.—Europium-activated yttrium vanadate

About 5200 parts of an aqueous nitric acid solution is prepared and about 1287 parts of yttrium oxide, about 105 parts of europium oxide ($Eu_2O_3$) and about 0.77 part of cerium oxide are dissolved in the nitric acid solution. About 2000 parts of oxalic acid are added and the yttrium, europium and cerium values are precipitated as oxalates. The solid oxalates are removed by filtration, dried by warm air and are then blended with about 2860 parts of ammonium vanadate to form a relatively uniform mixture. The mixture is heated at about 1750° F. for about two hours. The material is then washed in about 4000 parts of a sodium hydroxide solution having a sodium hydroxide strength of about 10%. The material is then washed with water to a neutral pH and the solids are then removed by filtration. The solids are then dried and are suitable phosphor materials. When subjected to cathode ray excitation, the phosphor is about 70% as bright as material prepared without any cerium present, without any depreciable shift in color or decay time. Under substantially similar conditions, a sample prepared in the above manner when subjected to ultra-violet excitation and compared with a control containing no cerium, an appreciable reduction in brightness is noted.

Example II

An europium-activated yttrium vanadate phosphor is prepared, as in Example I, except that only about 1/10 of the amount of cerium is used. The brightness of the phosphor when compared with the phosphor without the cerium is about 80% bright and no other appreciable change in the properties of the phosphor is noted.

Example III

The same procedure in Examples I and II is followed except that only 0.016 part of cerium are added. The resulting phosphor has 90% of the brightness achieved without the cerium additive.

The foregoing examples indicate that the brightness desired can be controlled by adding a known amount of cerium to the solution from which the rare earths and europium are precipitated as oxalates.

Example IV

The same procedure as Example I is followed except that about 21 parts of europium oxide are used. The resulting phosphor has about 50% of the brightness of a phosphor having the same ratio of yttrium and europium but without the cerium additive.

Example V.—Europium-activated yttrium oxysulfide

About 6500 parts of an aqueous nitric acid solution is prepared and about 2160 parts of yttrium oxide, about 161 parts of europium oxide, and about 0.54 part of cerium oxide are dissolved in the nitric acid solution. About 3000 parts of oxalic acid are added and the yttrium, europium, and cerium values are co-precipitated as the oxalates. The oxalates are washed until neutral with hot deionized water and thereafter are filtered and dried. The oxalates are fired for about 4 hours at about 2250° F. The resultant oxide phosphor is fired at about 2150° F. in an atmosphere of $H_2S$—$N_2$ for about 2 hours to form the yttrium oxysulfide phosphors. When subjected to cathode ray excitation the phosphor is about 50% as bright as material prepared without any cerium added.

Example VI.—Europium-activated gadolinium oxide

About 3460 parts of $Gd_2O_5$, 161 parts of $Eu_2O_3$ and 1.75 parts of cerium oxide are dissolved in 10,000 parts of an aqueous nitric acid solution. About 4000 parts of oxalic acid are added to the nitric acid solution and the gadolinium, europium, and cerium values are co-precipitated as the oxalates. The oxalates are washed until neutral with hot deionized water. The oxalates are removed by filtration and dried with warm air. The oxalates are heated at about 2150° F. for about 2 hours. When the material, after heating, is excited by cathode rays the phosphor is about 40% as bright as material prepared with no cerium present.

Example VII.—Yttrium-gadolinium oxide

About 3080 parts of $Gd_2O_3$, 239 parts of $Y_2O_3$, 161 parts of $Eu_2O_3$ and 0.49 part cerium are dissolved in about 11,000 parts of an aqueous nitric acid solution. About 4500 parts of oxalic acid are added to the mixed nitrate solution and the gadolinium, yttrium, europium and cerium values are co-precipitated as the oxalates. The oxalates are washed until neutral with hot deionized water. The oxalates are removed by filtration and dried. The mixed oxalates are thereafter heated at about 2150° F. for about 2 hours. When the material, after heating, is excited with cathode rays the brightness is about 65% as bright as essentially identical material prepared with no cerium present.

While there have been shown and described what are at present considered the preferred embodiments of the invention, it will be obvious to those skilled in the art that various changes and modifications may be made herein without departing from the scope of the invention as defined by the appended claims.

We claim:

1. In the manufacture of europium-activated rare earth phosphor compositions selected from the group consisting of europium-activated rare earth oxide phosphors, europium-activated rare earth phosphors derived from europium-activated rare earth oxides and mixtures thereof, the improvement comprising reducing the brightness and controlling said reduction in the brightness of said phosphor composition by incorporating a controlled amount of cerium in the +3 valence state into said europium-activated rare earth oxide at the time of synthesis of said europium-activated rare earth oxide.

2. An improvement according to claim 1 where said phosphor is an europium-activated rare earth phosphor derived from an europium-activated rare earth oxide.

3. An improvement according to claim 1 wherein said phosphor is a europium-activated rare earth oxide phosphor.

4. An improvement according to claim 3 wherein said europium-activated rare earth material is precipitated from an aqueous solution as an oxalate and said amount of cerium is present in said oxalates.

5. An improvement according to claim 3 wherein said rare earth phosphor is europium-activated yttrium oxide and wherein the amount of cerium is from about $1.75 \times 10^{-5}$ to about $0.8 \times 10^{-3}$ mole of cerium per mole of yttrium.

6. An improvement according to claim 3 wherein said rare earth phosphor is europium-activated gadolinium oxide and the amount of cerium is from about $1.75 \times 10^{-5}$ to about $0.8 \times 10^{-3}$ of cerium per mole of gadolinium.

References Cited

UNITED STATES PATENTS 3,322,682　5/1967　Thompson _____ 252—301.4

ROBERT D. EDMONDS, Primary Examiner

U.S. Cl. X.R.

252—301.4